US006356805B1

(12) United States Patent
Fletcher

(10) Patent No.: US 6,356,805 B1
(45) Date of Patent: Mar. 12, 2002

(54) METHOD AND APPARATUS FOR CONTROLLING THE DISPENSING OF MONEY

(75) Inventor: Paul Robert Fletcher, Camberley (GB)

(73) Assignee: Mars Incorporated, McLean, VA (US)

( * ) Notice: Subject to any disclaimer, the term of this patent is extended or adjusted under 35 U.S.C. 154(b) by 0 days.

(21) Appl. No.: 09/391,736

(22) Filed: Sep. 8, 1999

(30) Foreign Application Priority Data

Sep. 9, 1998 (GB) ............................................ 9819669

(51) Int. Cl.[7] ................................................ G06F 17/00

(52) U.S. Cl. ........................... 700/240; 700/231; 453/1; 453/2

(58) Field of Search ................................. 700/231, 240, 700/242; 194/217; 453/17, 20, 21, 1, 2

(56) References Cited

U.S. PATENT DOCUMENTS 4,883,158 A * 11/1989 Kobayashi et al. ......... 194/217
5,499,944 A * 3/1996 Weston et al. ................ 453/17
5,595,277 A 1/1997 Hoormann et al.

FOREIGN PATENT DOCUMENTS

| | | | |
|---|---|---|---|
| EP | 0 734 003 | A2 | 9/1996 |
| EP | 0 653 085 | B1 | 3/1997 |
| GB | 2 284 090 | A | 5/1995 |
| GB | 2 326 504 | A | 12/1998 |
| WO | WO 95/14290 | | 5/1995 |

* cited by examiner

*Primary Examiner*—Christopher P. Ellis
*Assistant Examiner*—Khoi H. Tran
(74) *Attorney, Agent, or Firm*—Fish & Richardson P.C.

(57) ABSTRACT

A method of controlling the dispensing of money in the form of units available in a plurality of denominations includes selecting the units for a dispensing operation by considering the rate of change of the number of stored units for at least one denomination.

10 Claims, 3 Drawing Sheets

METHOD AND APPARATUS FOR CONTROLLING THE DISPENSING OF MONEY

This invention relates to a method of, and an apparatus for, controlling the dispensing of money in the form of units having a plurality of denominations. The invention is particularly, but not exclusively, applicable to machines such as vending machines which receive coins of a plurality of denominations, and which have a plurality of stores each containing coins of a respective denomination, and each possibly being capable of being replenished by insertion of coins into the vending machine. Means are provided for dispensing coins from the stores in an amount which corresponds to the difference between the amount inserted, and the value of the vend or vends performed by the machine.

The invention is not limited to such arrangements. The dispensed monetary units could be, for example, banknotes, or a mixture of banknotes and coins. The invention also has wider applicability than vending machines; it may be applied to change-giving machines of any type.

In the field of vending machines, it is well know to use a dispensing control means which calculates a preferred combination of coins for dispensing in the form of change. One typical way of achieving this, referred to as the "least number of coins" method, involves using as many higher-denomination coins as possible, so that the total number of dispensed coins is minimised. This is intended to maximise the number of coins retained in the stores so that change remains available for the maximum number of transactions. Also, users of machines generally prefer their change in the form of fewer high-denomination coins.

EP 0 653 085 A (the contents of which are incorporated herein by reference) discloses a method of determining the combination of monetary units to be dispensed in which several combinations of monetary units totalling the desired amount are calculated.

In such systems, there is often a tendency for the apparatus frequently to dispense the same denomination. For example, in machines that have many products that can be vended at a vend price of 40p, users will often insert 50p or £1 coins. Assuming that the machine can dispense a variety of different coin denominations, the "least number of coins" technique may result in the apparatus frequently selecting 10p, or a combination of a 50p and 10p, for dispensing as change. This reduces the number of available 50p and 10p coins for future change-giving operations. If for example the machine runs out of 10p coins, it may no longer be possible to give change, or perhaps only possible by using a large number of smaller-denomination coins which is less desirable from the point of view of the machine user.

As a machine is used, the relative numbers of coins (or other units) of different denominations which are available for dispensing tends to vary, depending upon the types of units inserted, and the vend prices.

WO 95/14290 (the contents of which are incorporated herein by reference) discloses a method similar to that of EP 0 653 085 A but in which an availability factor, dependent on the number of available units of at least one denomination, is also used to determine the best distribution of units for dispensing.

The method described in that document represents one technique for compensating at least partly for this change in distribution, so as to maintain as many different denominations available for as long as possible. The present invention can be used as an alternative technique for maintaining as many different denominations available for as long as possible.

The present invention provides a method of controlling the dispensing of money in the form of units available in a plurality of denominations comprising selecting the units for a dispensing operation by considering the change in the number of stored units for each denomination over at least two preceding dispensing operations.

The invention also provides an apparatus for dispensing money in the form of units available in a plurality of denominations comprising means for selecting the units for a dispensing operation by considering the change in the number of stored units for each denomination over at least two preceding dispensing operations.

An arrangement embodying the invention will now be described by way of example with reference to the accompanying drawings, in which.

Figure 1:
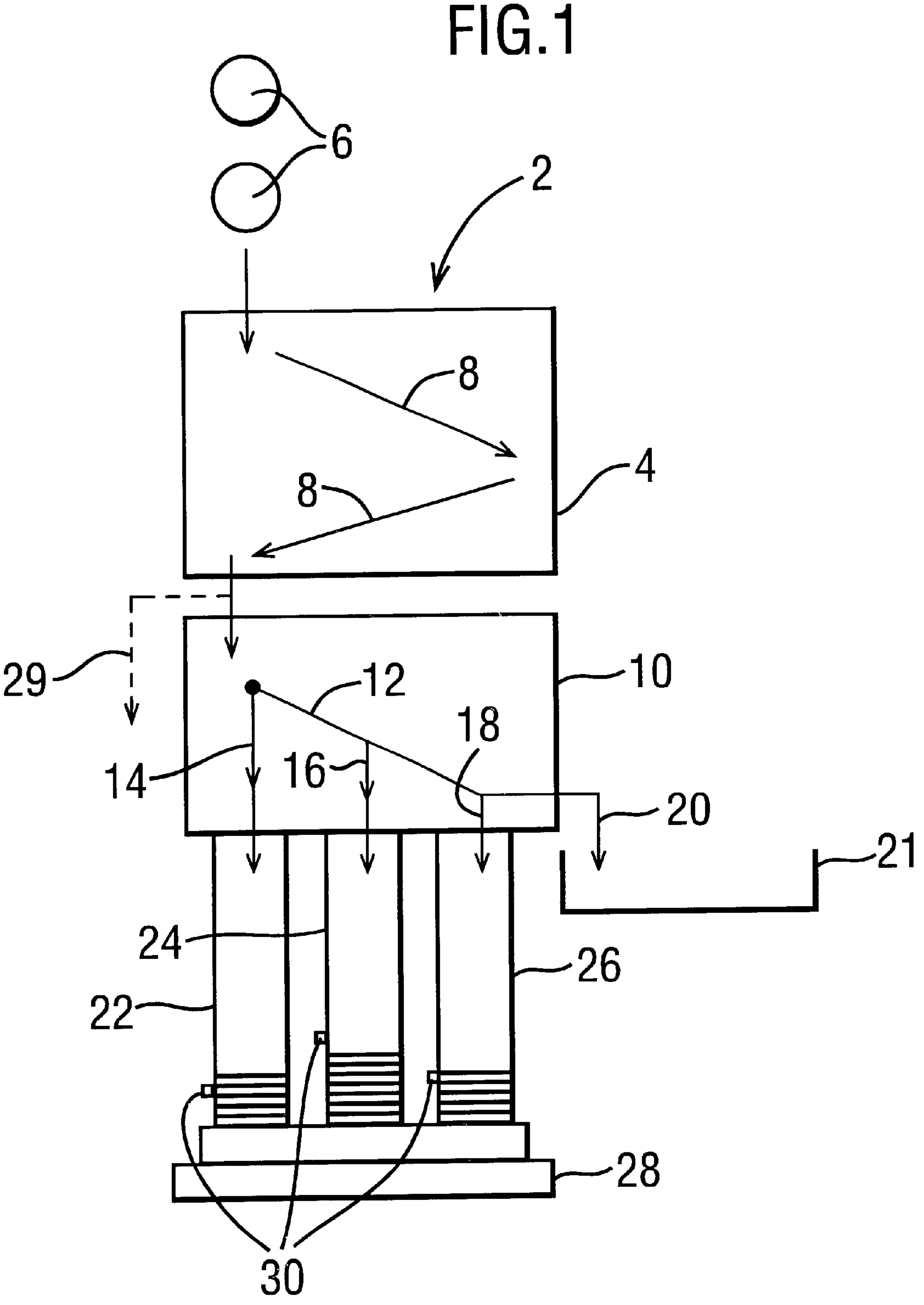
FIG. 1 is a schematic diagram of the mechanical part of a coin handling apparatus in accordance with the invention.

Referring to FIG. 1, the coin handling apparatus 2 includes a coin validator 4 for receiving coins as indicated at 6. During the passage of the coins 6 along a path 8 in the validator 4, the validator provides signals indicating whether the coins are acceptable, and if so the denomination of the coins.

Acceptable coins then enter a coin separator 10, which has a number of gates (not shown) controlled by the circuitry of the apparatus for selectively diverting the coins from a main path 12 into any of a number of further paths 14, 16 and 18, or allowing the coins to proceed along the path 12 to a path 20 leading to a cashbox 21. If the coins are unacceptable, instead of entering the separator 10 they are led straight to a reject aperture via a path 29.

Each of the paths 14, 16 and 18 leads to a respective one of three coin tubes or containers 22, 24 and 26. Each of these containers is arranged to store a vertical stack of coins of a particular denomination. Although only three containers are visible in the figure, any number (and preferably at least four) may be provided.

Level sensors 30 are provided for indicating whether or not the number of coins in the respective tubes reaches a level determined by the position of the sensors.

A dispenser indicated schematically at 28 is operable to dispense coins from the containers when change is to be given by the apparatus.

Figure 2:
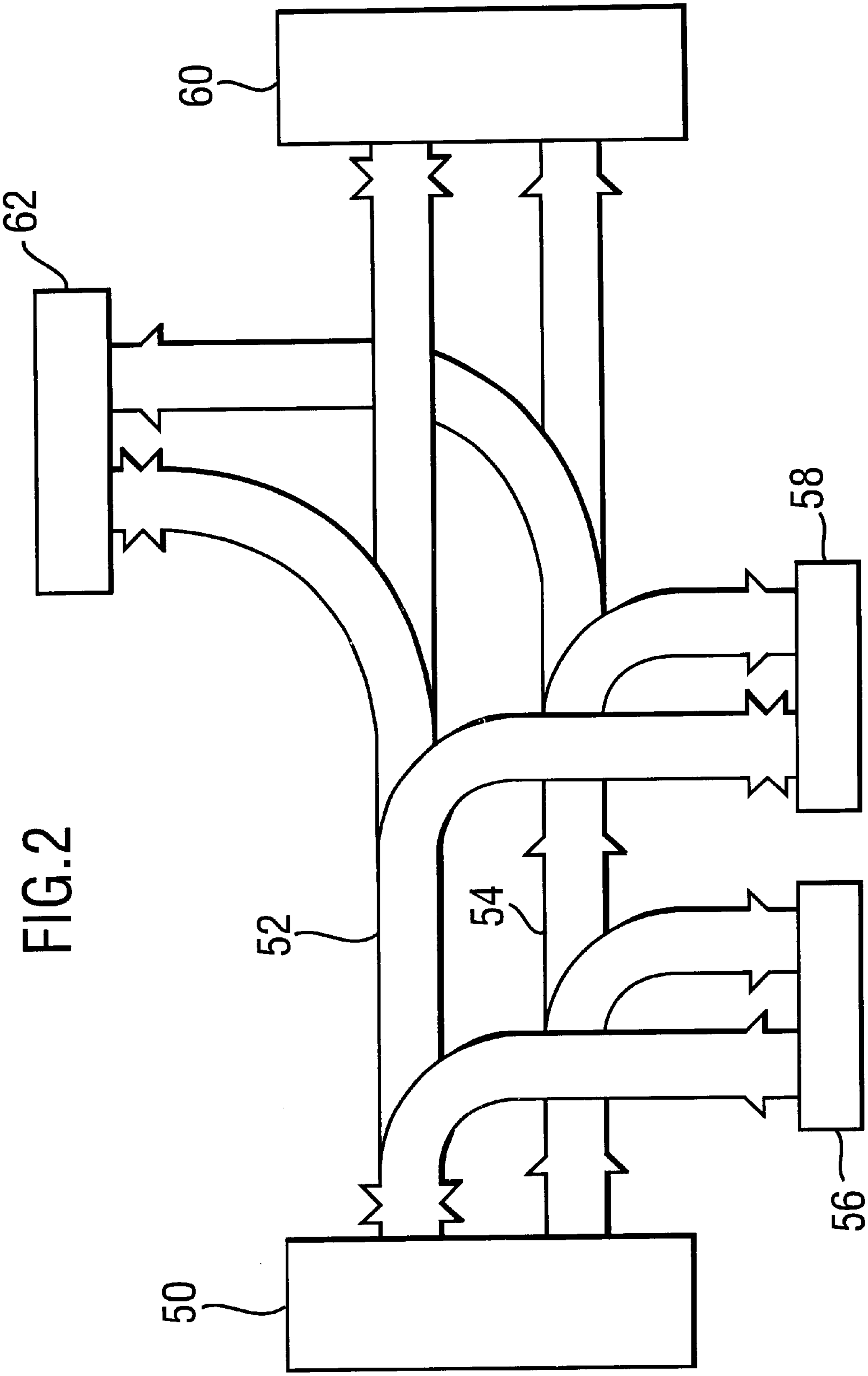
FIG. 2 is a block diagram of the circuit of the coin handling apparatus.

Referring to FIG. 2, the circuit of the present embodiment of the invention incorporates a microprocessor 50 connected to data and address buses 52 and 54. Although separate buses are shown, data and address signals could instead be multiplexed on a single bus. A bus for control signals could also be provided.

The microprocessor 50 is connected via the buses 52 and 54 to a read-only memory (ROM) 56 and a random access memory (RAM) 58. The ROM 56 stores the program controlling the overall operation of the microprocessor 50, and the RAM 58 is used by the microprocessor 50 as a scratch-pad memory.

The microprocessor 50, the ROM 56 and the RAM 58 are, in the preferred embodiment, combined on a single integrated circuit.

The microprocessor 50 may also be connected via the buses 52 and 54 to an EAROM 60 for storing a variety of alterable parameters.

The microprocessor 50 is also coupled via the buses 52 and 54 to input/output circuitry indicated at 62. The circuitry 62 includes at least one level sensor 30 for each of the coin containers 22, 24 and 26, circuits for operating the dispenser 28 and the gates of the coin separator 10, the circuitry of the coin validator 4, and a display visible to a user of the apparatus for displaying an accumulated credit value and an indication when insufficient coins are stored to guarantee that change will be available.

The input/output circuit 62 also includes an interface between the control circuit of the apparatus and a vending machine to which it is connected.

In operation of the apparatus the microprocessor 50 successively tests the signals from the validator to determine whether a coin has been inserted in the apparatus. When a credit has been accumulated, the microprocessor also tests signals from the vending machine to determine whether a vending operation has been carried out. In response to various signals received by the microprocessor 50, various parts of the program stored in the ROM 56 are carried out. The microprocessor is thus arranged to operate and receive signals from the level sensors 30 of the coin containers 22, 24 and 26, and to control the gates in the separator 10 in order to deliver the coins to the required locations, and is also operable to cause appropriate information to be shown on the displays of the apparatus and to deliver signals to the vending machine to permit or prevent vending operations. The microprocessor is also operable to control the dispenser to deliver appropriate amounts of change.

As part of this procedure, the microprocessor keeps track of the number of coins sent to and dispensed from each of the containers 22, 24 and 26. The microprocessor also keeps track of the total number of coins in each of the containers 22, 24 and 26, keeping a running total which is altered as coins are sent to and dispensed from the containers, the running total being recalibrated in response to the level sensor 30 of the associated coin container becoming covered or uncovered as the level of coins changes. The techniques may correspond to those disclosed in EP-A-0076640.

The arrangement so far is quite conventional, and the details of particular structures suitable for use as various parts of the mechanism will therefore not be described in detail.

The particular sequence of most of the operations carried out by the microprocessor may be the same as in previous apparatus. A suitable program to be stored in the ROM 56 can therefore be designed by anyone familiar with the art, and accordingly only the operations carried out by the particularly relevant parts of this program will be described.

After each vending operation has been completed, by dispensing the vended product or service and the appropriate change, the processor calculates a difference value for each of the containers 22, 24, 26 for that dispensing operation. For each container, the difference value D is the difference between the number of coins sent to that container and the number of coins dispensed from that container in the latest vending operation. The processor then calculates for each container a rate of change value, R, which is the average of the difference values for the respective containers for the last 50 vending operations.

The rate values R give an indication of whether the respective container tends to deplete, because overall more coins of the respective denomination are being dispensed than are being inserted, in which case R is a negative value, or tends to fill up, in which case R is a positive value. The size of R gives an indication of how quickly the container tends to fill or deplete, a bigger R corresponding to a faster rate. The rate R may depend on various factors such as the prices of products available, the type of products being selected, which may, for example, depend on the time of day or the site of the vending machine, and the distribution of available coins, to give a few examples.

For the next vending operation, assuming that money has been inserted into the machine, and a product has been selected for vending, then the processor performs a routine described below with reference to FIG. 3 to determine the coins to be dispensed.

Initially, the amount to be dispensed, $A_1$, is set equal to the difference between a credit value, in this case representing the amount of cash inserted, and the price of the selected product. Then, in step 302, the highest rate value $R_1$ and the associated denomination $D_1$ are selected. In step 303, the largest whole number $n_1$ for which $n_1D_1 \leqq A_1$, and for which $n_1$ is less than or equal to the number of coins in the container available for change, is calculated. The number of coins available for change may be all the coins stored in the container, or all the coins above a threshold level greater than zero. Once n has been calculated, the processor then calculates a value $A_2$, where $A_2=A_1-n_1D_1$ (step 304), which gives the remaining amount to be dispensed. It is assessed whether or not $A_1-n_1D_1=O$ (step 305). If $A_1-n_1D_1$ is not equal to zero, then the processor repeats steps 302 to 305 with $A_2$, $R_2$, $D_2$, $n_2$ and $A_3$ in place of $A_1$, $R_1$, $D_1$, $n_1$ and $A_2$ respectively, where $R_2$ is the second highest rate value. Subsequently, if $A_3$ is not equal to zero, then the processor similarly also repeats steps 302 to 304 with $A_3$, $R_3$, $D_3$, $n_3$ and $A_4$ in place of $A_2$, $R_2$, $D_2$, $n_2$ and $A_3$ respectively, where $R_3$ is the third highest rate value.

In the above, if two or more of the rate values are the same, then the rate values are ordered by the size of the corresponding denominations, starting with the highest denomination and proceeding in order of decreasing denomination. This is so that the fewest coins are dispensed.

The above procedure results in at most three non-zero values of n, and $A=n_1D_1+n_2D_2+n_3D_3$. This combination represents the selected combination for dispensing, where $n_i$ is the number of coins of the respective denomination $D_i$ that are to be dispensed.

After the coins have been dispensed, the rate values are updated using information about the latest dispensing operation, as described above.

To illustrate the method described above with a simple example, suppose the coin mechanism accepts £1, 50p, 20p and 10p coins. £1 coins are sent straight to a cashbox, and the mechanism has respective containers for 50p, 20p and 10p. Suppose that the rate values for 50p, 20p and 10p coins are −4,3 and 3. A user selects a product priced 40p and inserts a £1 coin. Thus 60p needs to be dispensed as change. R(20) and R(10) (that is the rate for the 20p and the rate for the 10p respectively) are the highest, but they are the same. R20 is selected as $R_1$ because 20p is of a higher value than 10p. In this example, there are 6×20p coins stored and the threshold value, below which the stored coins should not fall, is 4. Hence, only two 20p coins can be used instead of three which would add up to the required change. Thus, the difference of 20p must be made up of coins of other denominations. The next rate value to be considered is R10, and two 10p coins make up the required change. The change is then dispensed in the form of 2×20p coins and 2×10p coins. According to the "least coins" method, a 50p coin and a 10p coin would have been dispensed, but in this case, 50p coins have recently been used more often in change than in payment, as can be seen from the rate value, and accordingly will tend to run out, so that it is desirable to use other coins.

In accordance with the method described above, denominations of coins which according to overall recent past performance have been dispensed in greater numbers than they have been inserted are less likely to be used in dispensing in the next operation. As a result, the dispensing of coins evens out over all the containers and the risk of a container being empty, leading to a situation in which the vending machine can only accept exact change, is reduced. The coin mechanism is also adaptive to changes in external circumstances. Thus, the mechanism can operate for longer periods without the need for a service attendant to visit the machine to replenish certain coins, and also lost sales, which may result when a machine does not have sufficient coins to provide the required change for a given vending operation, can be reduced.

In the above example, rate values R are used in determining the combination of coins to be dispensed. Instead of using the rate value, a change value could be used, where the change value C for a given denomination is the sum of the number of coins of that denomination inserted minus the number of coins of that denomination dispensed over a number, say 50 or 100, of the previous vends. As with the rate value R, the sign of C indicates depletion or filling up of the respective container and the size of C is an indication of the magnitude of the depletion or filling up. In other words, it is not necessary to divide explicitly by the number of operations. In the above example, the rate value gives a rate of change with respect to the number of vending operations. Instead, the rate value may be calculated with respect to other variables, such as time. For example, rate values may be calculated by measuring the change in the number of stored coins for any denomination each hour, and working out the rate of change per hour.

The rate values R, or C, may be multiplied or divided by a weighting factor with the order of the resulting numbers being used to decide the order of selection of the corresponding denominations. For example, R may be multiplied by a weighting factor dependent on the total number of coins of a respective denomination stored in a container at a given time, so that if a relatively large number of coins is stored, they are more likely to be used for dispensing than if the weighting factor had not been used. Similarly, R may be multiplied by a weighting factor dependent on the denomination of the coins so that in some instances higher denomination coins are more likely to be selected for dispensing, which may mean that fewer coins are used. Also the values R or C may be related to, for example, divided by, the respective container coin capacity.

The methods described above may also be used in combination with other known methods. For example, the first coin for use in dispensing a certain amount may be calculated using a method described above, and then the combination of coins for the remainder may be calculated by a "least coins" method.

Figure 3:
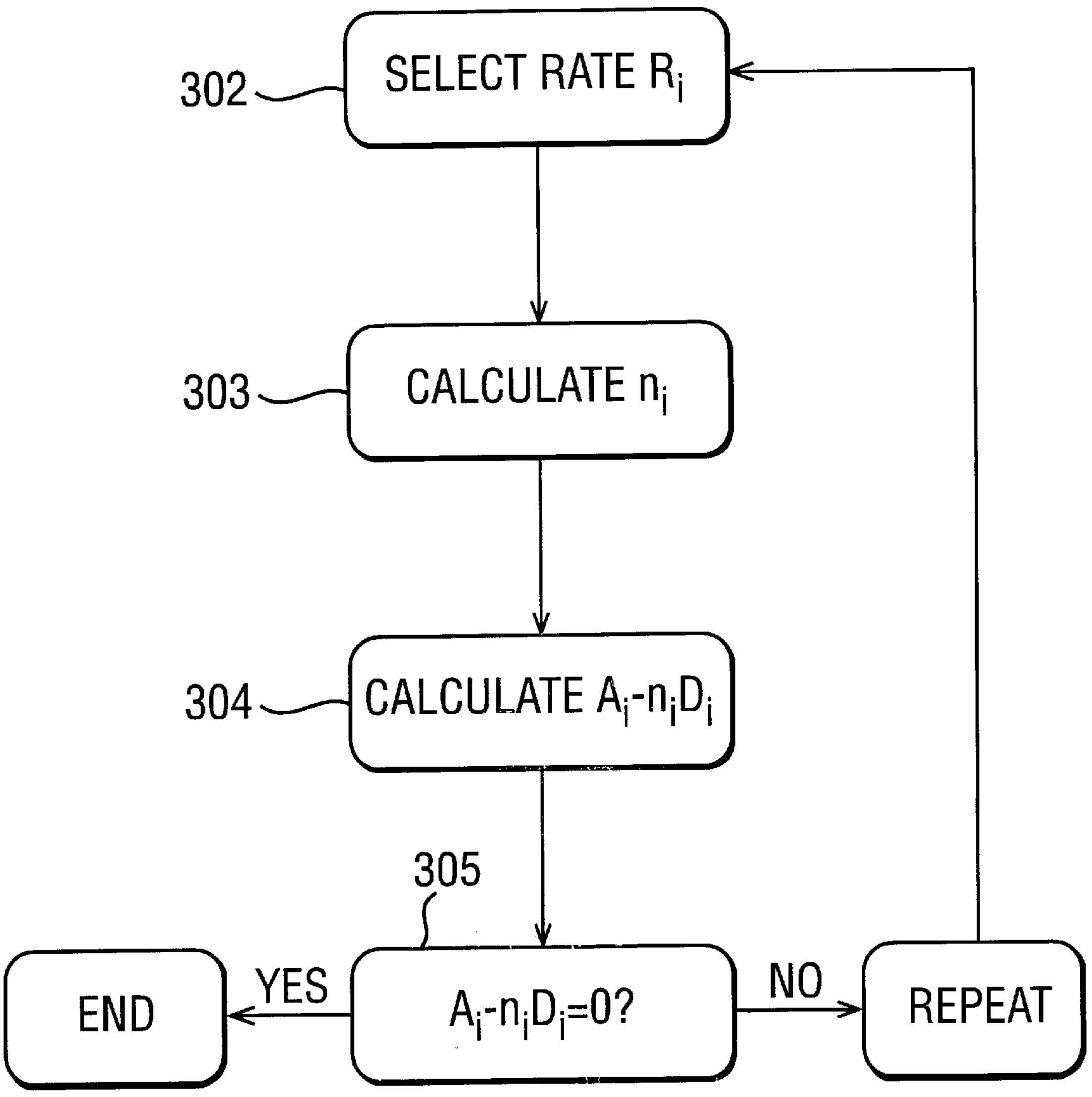
FIG. 3 is a flow chart illustrating how the circuit calculates a combination of coins to be paid out as change.

Following the execution of the routine of FIG. 3, if desired, the microprocessor may be arranged to illuminate a display indicating that insufficient change is available in response to a determination that the best combination produces coins which total less than the desired amount of change. The user may then act by changing the product selected for vending, by selecting a further product or by cancelling the selected product and obtaining a refund of the inserted cash.

It will be noted that in the above embodiment the determination of the combination of units to be dispensed is independent of the denominations of units inserted to obtain credit, although this could alternatively be taken into account also, if desired.

It will be noted that the technique described above has the advantage that the same processing routines can be carried out irrespective of the particular denominations which the apparatus is designed to receive and dispense, irrespective of the vend prices and indeed irrespective of the currency. To handle different situations it is merely necessary to have a memory storing the relative values of the different denominations handled by the apparatus. Preferably, for each dispensing container, the memory also stores parameters representing for example threshold levels and/or weighting factors.

What is claimed is:

1. A method of controlling the dispensing of money in the form of units available in a plurality of denominations comprising selecting the units for a dispensing operation by considering the rate of change of the number of stored units for at least one denomination.

2. A method as claimed in claim 1 wherein the rate of change is determined with respect to time.

3. A method as claimed in claim 1 wherein the rate of change is determined with respect to the number of transactions.

4. A method as claimed in claim 1 wherein for a transaction a difference value, representing the difference between the number of units of given denomination inserted and the number of units of the same denomination dispensed, is calculated.

5. A method as claimed in claim 4 wherein the average value of the difference values of a plurality of transactions for a denomination is used in selecting the units for dispensing.

6. A method as claimed in claim 1 wherein for each denomination a weighting factor related to the value of a respective denomination is used to determine the selection.

7. A method as claimed in claim 1 wherein a weighting factor related to the number of units of a respective denomination is used to determine the selection.

8. A method as claimed in claim 1 wherein a threshold level for a respective denomination is used to determine the selection.

9. An apparatus for dispensing money in the form of units available in a plurality of denominations comprising means for selecting the units for a dispensing operation by considering the rate of change of the number of stored units for at least one denomination.

10. An apparatus for controlling the dispensing of coins, comprising:

a coin validator for determining the acceptability and the denomination of the coin;

a plurality of coin tubes each arranged to store a vertical stack of coins of a particular denomination;

a plurality of level sensors each associated with a coin tube;

a dispenser operable to dispense coins from the coin tubes when change is to be given; and a means for keeping track of the number of coins in each coin tube and for selecting a coin tube for dispensing by considering the rate of change of the number of stored units for at least one denomination.

* * * * *